Figure 5:
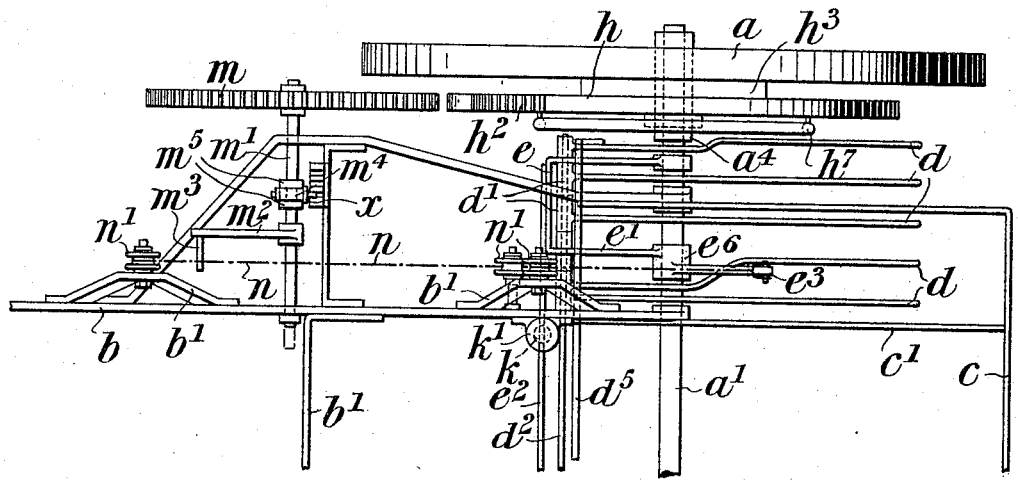

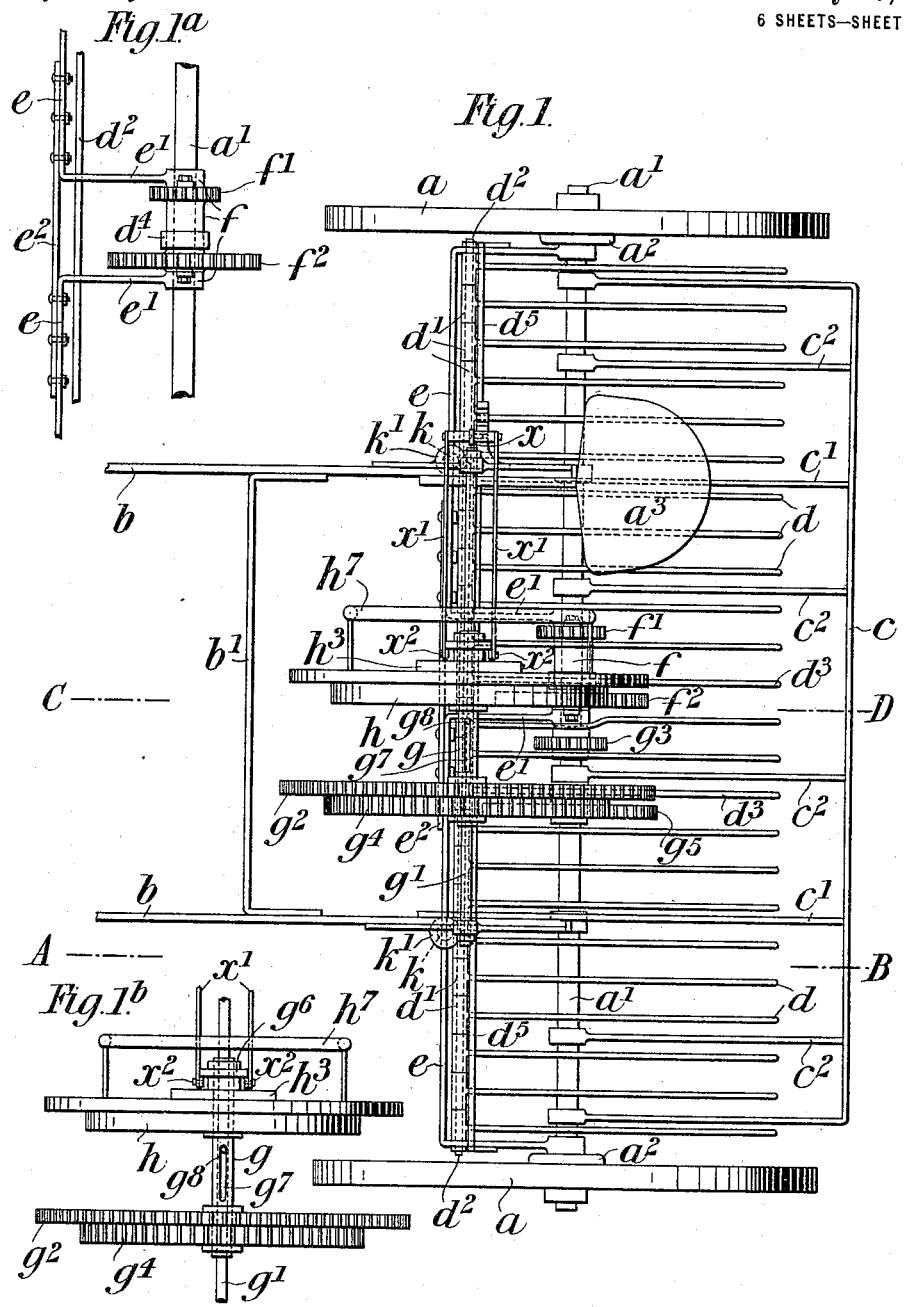

P. T. MAW.
HORSE OR OTHER TRACTION DRAWN HAY RAKE.
APPLICATION FILED NOV. 25, 1913.
1,148,181. Patented July 27, 1915.
6 SHEETS—SHEET 2.
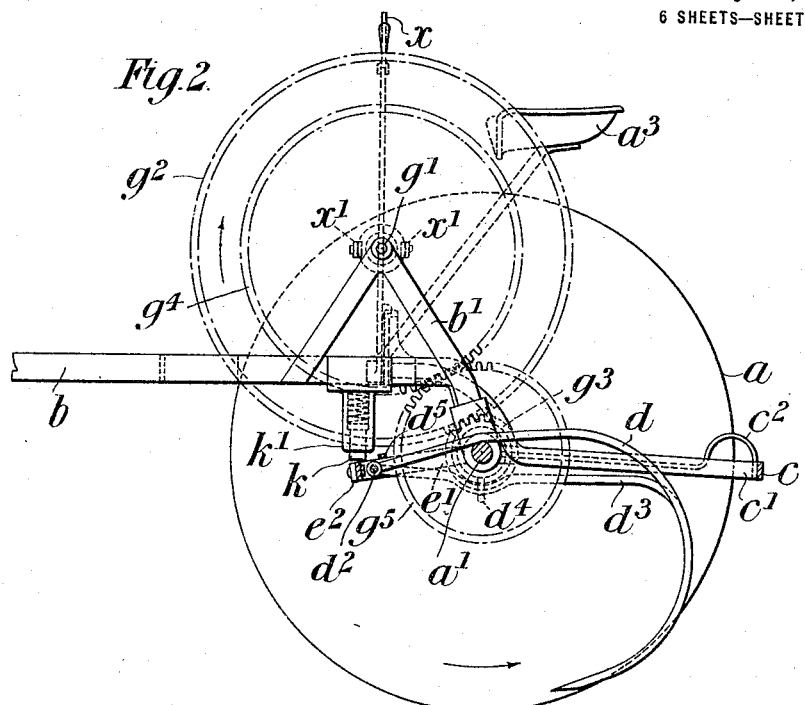
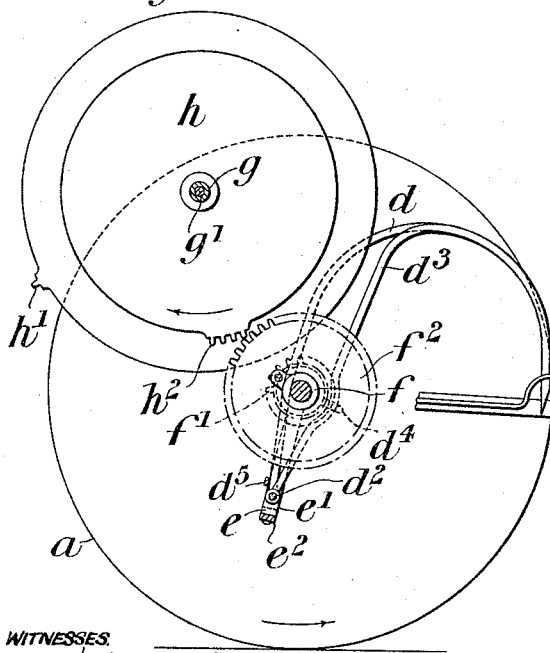
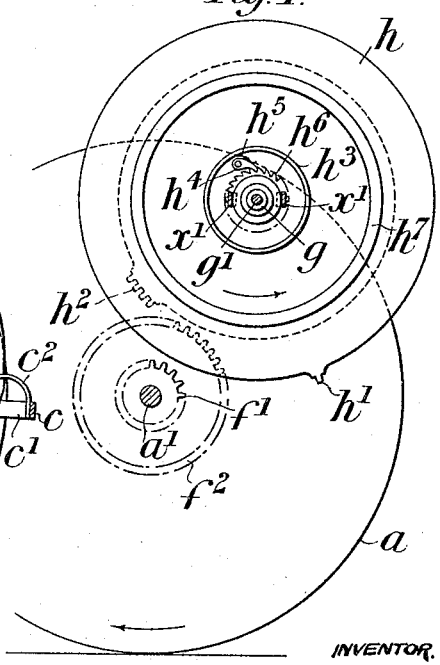

P. T. MAW.
HORSE OR OTHER TRACTION DRAWN HAY RAKE.
APPLICATION FILED NOV. 25, 1913.

1,148,181.

Patented July 27, 1915.
6 SHEETS—SHEET 3.

WITNESSES.

INVENTOR.

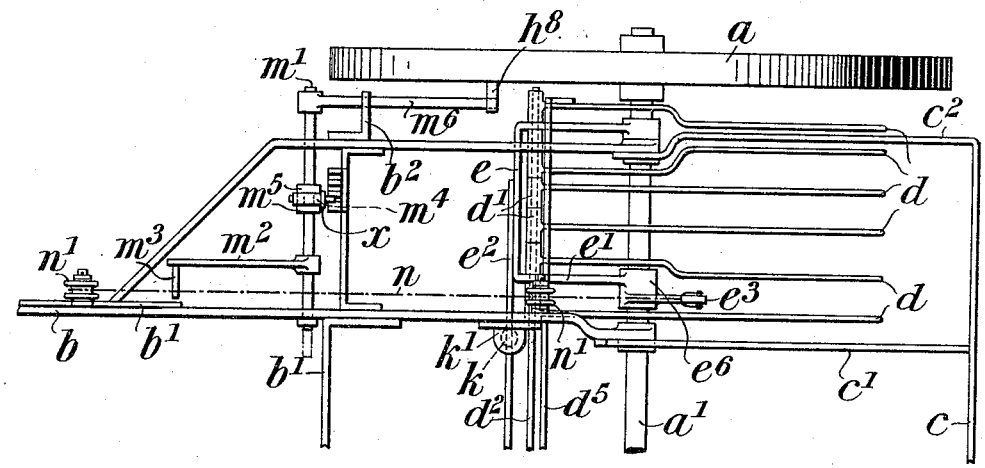
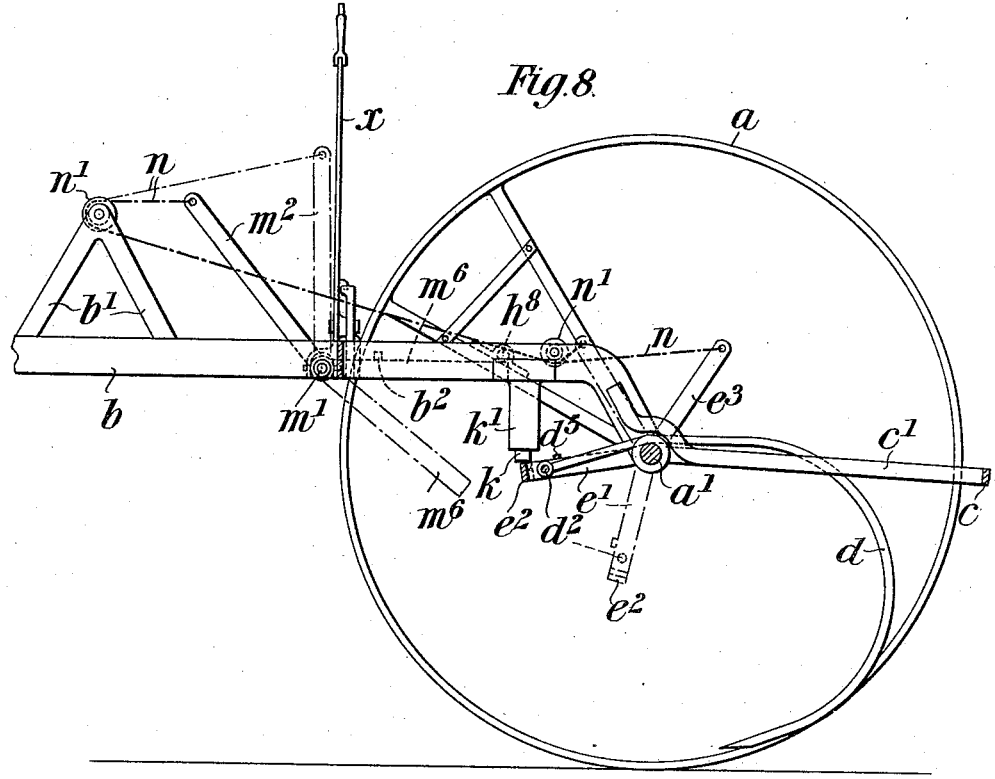

P. T. MAW.
HORSE OR OTHER TRACTION DRAWN HAY RAKE.
APPLICATION FILED NOV. 25, 1913.

1,148,181.

Patented July 27, 1915.
6 SHEETS—SHEET 5.

WITNESSES.

INVENTOR.

P. T. MAW.
HORSE OR OTHER TRACTION DRAWN HAY RAKE.
APPLICATION FILED NOV. 25, 1913.

1,148,181.

Patented July 27, 1915.
6 SHEETS—SHEET 6.

UNITED STATES PATENT OFFICE.

PERCIVAL TRENTHAM MAW, OF NUTFIELD, ENGLAND.

HORSE OR OTHER TRACTION DRAWN HAY-RAKE.

1,148,181.  Specification of Letters Patent.  Patented July 27, 1915.

Application filed November 25, 1913. Serial No. 802,996.

*To all whom it may concern:*

Be it known that I, PERCIVAL TRENTHAM MAW, a subject of the King of Great Britain, residing at Holmesdale, Nutfield, Surrey, England, have invented new and useful Improvements in Horse or other Traction Drawn Hay-Rakes, of which the following is a specification.

This invention relates to a means for automatically raising the tines of a horse or other traction drawn hay rake at certain fixed or regular or predetermined intervals.

Hitherto, in hay rakes of the ordinary type the tines have usually been raised for emptying them either by hand or foot levers, or by utilizing the forward travel of the machine. Rakes of this latter class have been called "self-acting," but in such rakes, as hitherto made, it has been necessary for the operator to throw mechanism into gear by means of a lever, or otherwise, each time that it was desired to empty the rake; and the actual moment at which the rake was emptied was in each case directly dependent upon the actual time or moment at which the said mechanism was thrown into gear. This entails great strain and toil upon the operator and renders accuracy and regularity in emptying the rake a most difficult matter.

According to my invention, I provide means whereby the rake can be raised and emptied at fixed, regular or predetermined intervals without necessitating, in the main use of the machine when it is being pulled along in a straight line, any action on the part of the driver of the machine in constantly throwing mechanism into operation or in and out of gear; for by my invention the raising of the tines takes place automatically every time the machine is moved along a certain distance. However, in one modification of my invention, the driver of the machine does throw mechanism in and out of gear so as to cause the rake to be raised and emptied at very long intervals, as when raking over a field after the main crop has been carried. But such a use does not comprise the main use of my machine, and, as the throwing of mechanism in and out of gear is only necessary, in this modification, when the rake has to be emptied at very long intervals, the labor and toil of so doing is not very great. But, even in this modification, it is not necessary to throw the mechanism into gear at exactly equal intervals so as to raise the rake at exactly equal intervals; for, when the mechanism is in gear, the raising of the rake will be dependent upon the road wheel having advanced to a certain point in its revolution, and thus, even in this modification, accuracy and regularity of work are rendered very easy, and are not entirely dependent upon the actual movement at which the mechanism is thrown into gear.

It will be seen that in my invention, the regularity of the recurrence of the intervals at which the tines are raised is due entirely or in part to automatic means.

Besides providing a means for insuring that the rake is emptied at precisely regular intervals as the machine is being pulled along from one end of the field to the other, I also, in some modifications of my invention, provide means whereby, when the machine is turned at the end of a field, the driver can regulate or determine the time when the rake shall be first raised after being turned around, and thus, each time the rake is raised, deposit the collected material in line with that already deposited. It is possible however, to effect this desirable result without the provision of any such special means, but to be enabled to do this requires considerable care and practice on the part of the driver of the machine.

In order that my said invention may be better understood, I will now proceed to describe the same with reference to the drawings accompanying this specification in which:—

Figure 6:
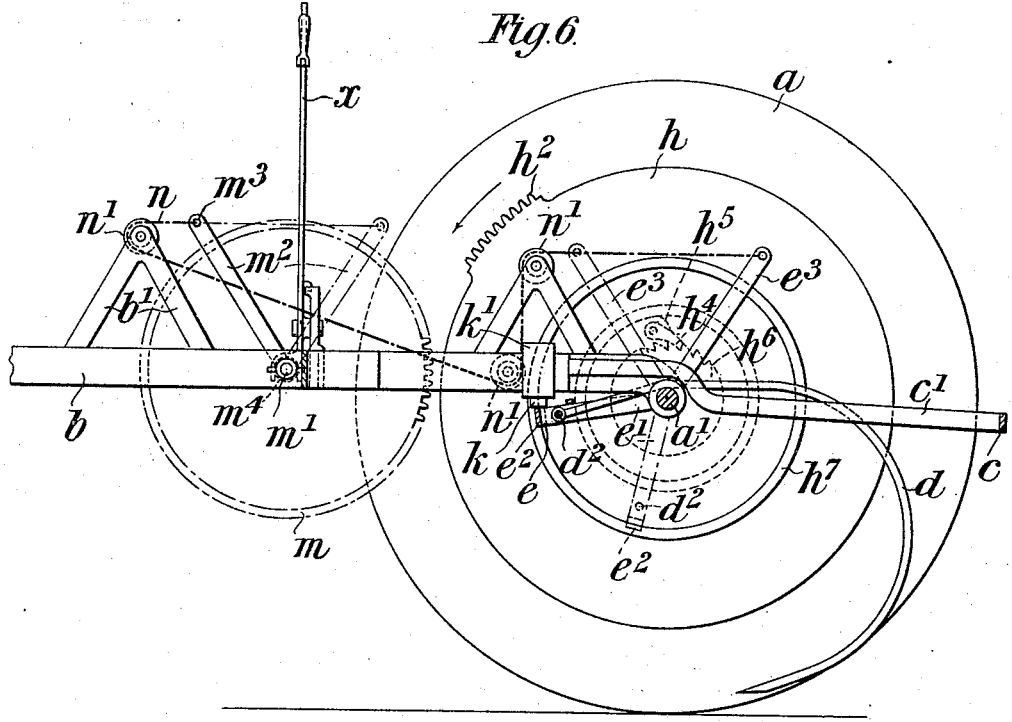
Figure 9:
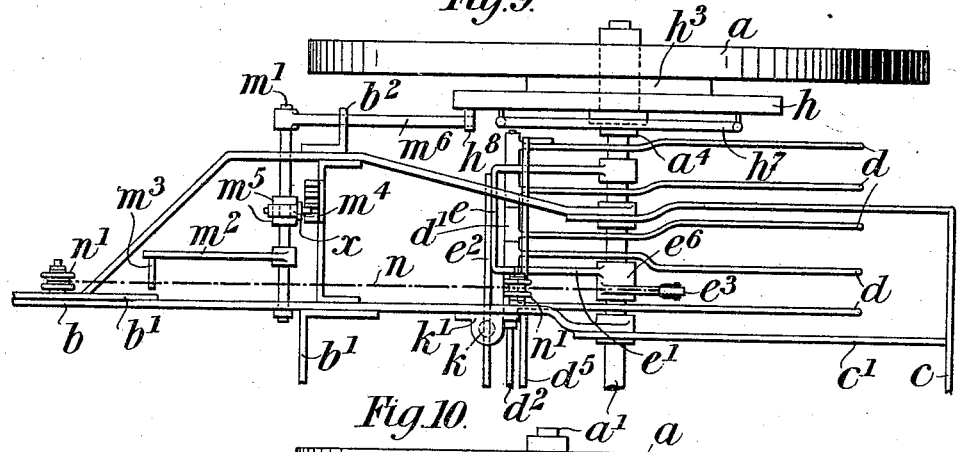
Figure 10:
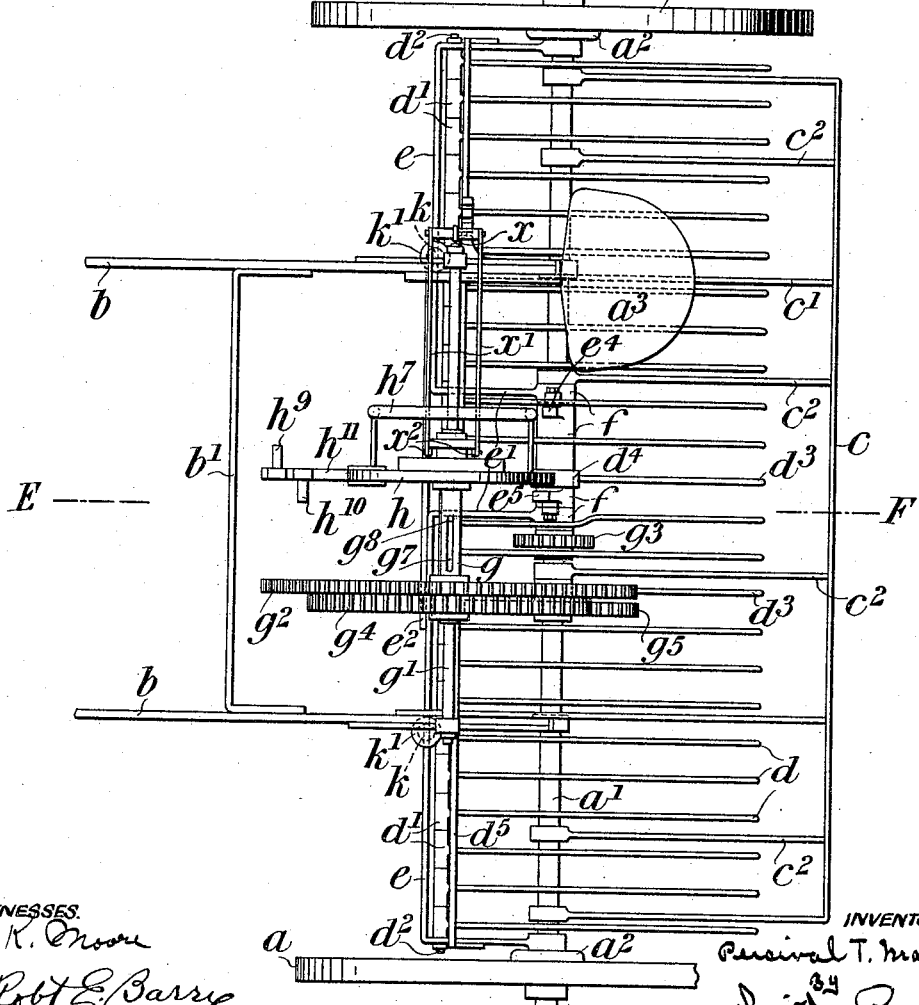
Figure 11:
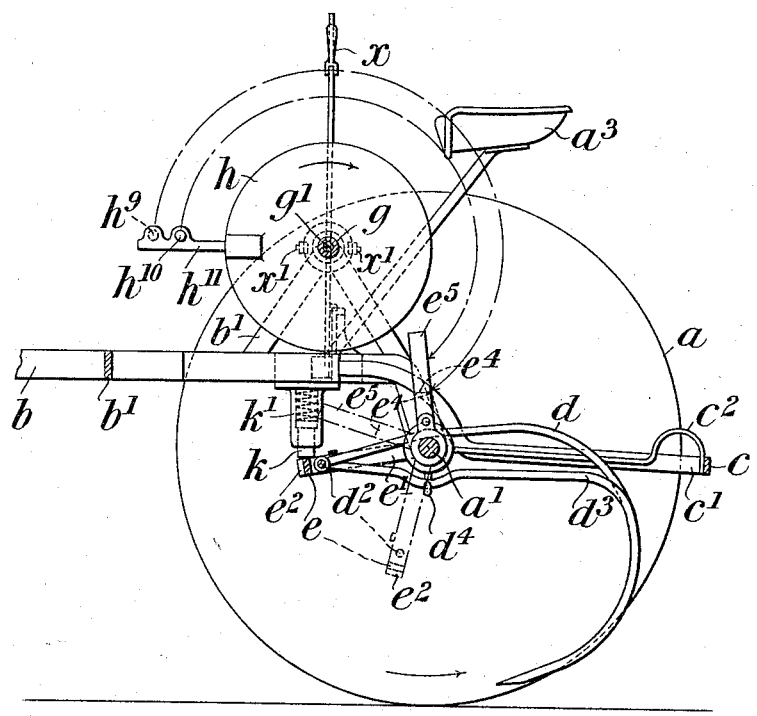

Figure 1 is a plan of one form of my invention. Figs. 1ᵃ and 1ᵇ show more clearly in plan certain details shown in Fig. 1. Fig. 2 is a section on the line A—B, Fig. 1. Fig. 3 shows further sectional details along the line C—D, Fig. 1. Fig. 4 shows in elevation further detail as seen from the opposite side of the machine. In Fig. 4 the rotary striking gear is not shown at the same point in its path of travel as in Fig. 3. Figs. 5 and 6 show a plan and section of a modification of my invention. Figs. 7 and 8 also show a plan and section of another modification. Fig. 9 is a plan of a slight modification of Fig. 7. Fig. 10 is a plan illustrating a slight modification of Figs. 1 and 2, and Fig. 11 is a section on the line E—F, Fig. 10.

In Fig. 1, $a$, $a$ indicate the usual road wheels and $a^1$ the main axle; $a^2$ is a driving clutch, $a^3$ the driver's seat, $b$, $b$ the horse shafts, $b^1$ part of the frame work, $c$ the stripping or clearing bar frame carried by members $c^1$ fixed to the horse shafts, and $c^2$ are stripping or clearing bars.

The usual series of tines $d$ is fixed to holders $d^1$ pivoted on a rod $d^2$, thus admitting of some movement if the tines meet with obstruction, and a rod or stop $d^5$ prevents the tines from falling far backward when they are raised upward.

$d^3$ are tines the upper parts of which are bent so as not to foul the gearing and which conveniently rest loosely on brackets $d^4$ loosely mounted on the axle or on the sleeve $f$.

$e$, $e^2$ is the rake frame with arms $e^1$ fixed to the sleeve $f$ loosely mounted on the axle $a^1$, this making a pivoted or rocking rake frame. When the rake is being emptied this sleeve is moved around by the striking part of the rotary mechanism $h$, which rotates by means of the forward travel of the machine, being actuated by suitable gearing, and the arms $e^1$ are thereby depressed and carry the frame $e$, $e^2$ down, thereby raising the tines $d$, $d^3$.

On the sleeve $f$ are two toothed wheels $f^1$, $f^2$ with which the rotary mechanism or striker $h$ engages respectively by toothed striking parts $h^1$, $h^2$, (Fig. 3) according to how frequently it is desired to empty the rake. When the toothed wheels $f^1$ or $f^2$ are engaged by the striking parts $h^1$ or $h^2$, a radius of the wheel $f^1$ or $f^2$ successively becomes or operates as an arm of a lever, having the axle $a^1$ as a fulcrum, the arm $e^1$ being the other arm of the lever; a leverage mechanism is thus provided adapted for depressing the rake frame $e$ and thereby raising the rake tines $d$, $d^3$, the said leverage mechanism being operated by the said rotary striker $h$. The rotary striker $h$ is mounted on a sleeve $g$ on a counter shaft $g^1$, the said sleeve $g$ being driven from the main axle by gear wheels. A two speed or multiple speed gearing is here shown, a wheel $g^2$ meshing with a wheel $g^3$, and a wheel $g^4$ with a wheel $g^5$. The wheels $g^4$ and $g^5$ are here shown in mesh, and consequently the striker $h^2$ engages the wheel $f^2$.

In order to put the wheels $g^2$ and $g^3$ in mesh, and consequently the striking part $h^1$ and wheel $f^1$, the sleeve $g$ is moved along the shaft $g^1$ by an ordinary lever arrangement $x$ and rods $x^1$ pivoted at $x^2$ to a slipping collar $g^6$; or other well known means may be employed. A slot $g^7$ is cut in the sleeve $g$, so that the said sleeve can slide along the shaft $g^1$ to which it is keyed by a pin $g^8$, or other obvious means for changing the speed of the gearing may be adopted.

The rotary striker $h$ is loosely mounted on the sleeve $g$, but a flanged part or the like $h^3$ engages by means of a pawl $h^4$, (Fig. 4) (which is kept in position by a spring $h^5$), a circular ratchet $h^6$ fixed to the sleeve $g$. A circular handle rail $h^7$ is provided whereby the rotary mechanism or striker may be turned around by hand in one direction but not in the other, so that, after turning at the end of a field, the striker can be set at any position so as to determine the time when the tines shall be first raised and so that the rake shall automatically and intermittently be successively emptied at places in line with the hay already deposited.

As will be seen, the striker can be moved by hand in one direction only, but not in the other.

The pivoted rake bar $e$ falls back, after the rakes have been raised, on to a shock absorber comprising an air compressing or spring compressing plunger $k$ passing into a cylinder $k^1$. This forms a pressure resisted shock absorber and it also provides a suitable stop for the frame $e$ to prevent the rake teeth coming nearer to the ground than is desired. In Fig. 3 the tines are shown raised up, the striker $h^2$ being just about to pass out of operation. It will be seen that the striking part of the rotary striker $h$ is adapted to engage automatically and intermittently with the aforesaid leverage mechanism, and thus the tines are raised automatically and intermittently at certain fixed or regular or predetermined intervals.

Figs. 5 and 6 show a modification of my lifting apparatus in which the striker $h$ rotates at only one speed. In this modification, as shown, it is mounted on a sleeve $a^4$ forming part of, or carried around by, the hub of the road wheel, but, if desired, a live axle may be used.

The striker $h$ engages with a toothed wheel $m$ mounted on a rod $m^1$ carrying a bar $m^2$ with a projecting rod $m^3$. When the striking part $h^2$ engages the wheel $m$, the rod $m^1$ begins to rotate and the bar $m^2$, which is keyed to the rod $m^1$, is also moved, as shown by the dotted lines in Fig. 6. Attached to the rod $m^3$ is one end of a chain $n$ passing over pulleys $n^1$, the other end of the said chain being attached to the end of a lever $e^3$, which is fixed to a loose sleeve $e^6$ on the axle to which also one of the arms $e^1$ is fixed. Thus when the striker $h^2$ engages the wheel $m$ the arm or bar $m^2$ pulls the chain $n$ and, consequently, the arm $e^3$ is pulled forward and depresses the rake frame $e$, thereby raising the tines.

The wheel $m$ can be put out of engagement with the striker $h^2$ by a lever $x$ pulling the rod $m^1$ sidewise, the said lever being conveniently connected to a collar $m^4$ slipping on the rod $m^1$ and placed between two set collars $m^5$. The lever $x$ has the ordinary spring pressed rod engaging with a ratchet plate.

In the modification just described the rake is designed to be emptied once with every revolution of the road wheel, as is also the case in the modifications shown in Figs. 7, 8 and 9, and therefore, in these cases, I use very large road wheels. So also in these cases, when a field is being raked over after the main crop has been harvested and when it is desired to empty the rakes, say, only once during every sixth revolution of the road wheels, it is necessary for the driver of the machine to throw the wheel $m$ into gear just after the fifth revolution and then wait till the rake is emptied and then throw it out of gear, and so on. It will thus be seen that in these cases and under the aforesaid circumstances the driver of the machine is called upon to throw mechanism in and out of gear. But it must be pointed out that such a necessity arises only in the modifications shown in Figs. 5 and 6, 7 and 8, and 9 and then only when the rake has to be emptied at very long intervals. Even when so using the rake, however, the mechanism has not to be thrown into gear at the very moment that the rake has to be emptied, as in other self lifting rakes, but, as is obvious, it suffices if the mechanism is thrown into gear some time during the sixth or other desired revolution of the road wheel, but before the striking teeth $h^2$ meet the wheel $m$. Provided this is done, the rake is emptied successively at precisely the same distance down the whole length of the field, thus working more accurately than has hitherto been possible.

Figs. 7 and 8 show a modification of Figs. 5 and 6. In this modification the wheel $m$ is substituted by a lever bar $m^6$ and the striking arrangement $h$, $h^2$, $h^3$, is replaced by a fixed striking bar $h^8$ carried around by the road wheel $a$. A bar or stop $b^2$ prevents the bar $m^6$ from rising above a horizontal position. In this variation no means are provided for setting the position of the striker when the machine is turned around at the end of the field, and therefore the driver of the machine must so turn at the end of the field that the rake will empty itself successively in lines with the material already deposited; this is not altogether an easy matter but with care and practice it can be done quite well. Obviously, if desired, the mechanism $h$, $h^3$ as used in Figs. 5 and 6 may be used, a striking bar $h^8$ being substituted for the striking teeth $h^2$, and the lever $m^6$ for the wheel $m$. This modification is shown in Fig. 9.

In Figs. 10 and 11 which show a slight modification of Figs. 1 and 2, instead of having striking teeth $h^1$, $h^2$, engaging with toothed wheels $f^1$, $f^2$, two striking bars $h^9$, $h^{10}$ carried by a bar $h^{11}$ fixed to the mechanism $h$ are used. These bars $h^9$, $h^{10}$, engage respectively one of two lever bars $e^4$, $e^5$ fixed to the sleeve $f$, and as these lever bars $e^4$, $e^5$ are moved downward the arms $e^1$ depress the frame $e$ and thus raise the tines $d$.

The two speed gearing shown in Figs. 1 and 10 is of the most simple nature, but I may obviously make use of other suitable well known equivalent means. In all cases the tines after being raised assume automatically their normal position. The striking mechanism is here shown so that the arms $e^1$ when depressed never come into a vertical position, and the tines $d$, $d^3$ do not fall backward when they are raised up.

Claims:

1. In a hay rake, the combination with the rake tines, of means for automatically lifting the said tines at predetermined intervals during the forward travel of the machine.

2. In a hay rake, the combination with the road wheels and a main axle, of rake tines, and means for automatically lifting the said tines at predetermined intervals during the forward travel of the machine.

3. In a hay rake the combination with the road wheels, a main axle, a rocking rake-frame and a series of tines mounted in the said frame, of means for automatically lifting the said tines at predetermined intervals during the forward travel of the machine.

4. A hay rake having in combination road wheels, a main axle, a series of rake tines, a rocking rake frame, a leverage mechanism connected with said rake frame, and a striker rotated by means of the forward travel of the machine and adapted to engage automatically and intermittently with the said leverage mechanism, substantially as described and illustrated.

5. A hay rake having in combination road wheels, a main axle, a rake frame and a series of tines mounted in said frame, a leverage mechanism connected with said rake frame, a striker rotated by means for the forward travel of the machine and adapted to engage automatically and intermittently with the said leverage mechanism, and means for varying the intervals at which the striker engages said leverage mechanism.

6. In a self-acting hay rake, the combination with the road wheels, a main axle, a rake frame having a series of tines, of a leverage mechanism connected to said frame, a striker rotated by means of the forward travel of the machine and adapted to engage automatically and intermittently with the said leverage mechanism, and multiple speed gearing provided between said axle and said striker.

7. In a self-acting hay rake the combination with the road wheels, main axle, rake tines and rake frame of a toothed wheel attached to the rake frame and a rotating member having a toothed segment to engage the said toothed wheel intermittently to lift the tines, substantially as described.

8. In a self-acting hay rake the combination with the road wheels, main axle, rake tines, rake frame and means for lifting the said tines at predetermined intervals of a pressure resisted shock absorber for the rake frame comprising a spring pressed plunger and a containing cylinder therefor, substantially as described.

9. In a self-acting hay rake, the combination with the road wheels, main axle, rake tines and rake frame, of a member attached to the rake frame, a rotating member adapted to engage said member intermittently to lift the tines, and manually operated means for moving said rotating member relatively to its supporting shaft.

10. In a self-acting hay rake, the combination with the road wheels, main axle, rake tines and rake frame, of a member attached to the rake frame, a rotating member adapted to engage said member intermittently to lift the tines, and means comprising a ratchet and pawl whereby the rotating member can be manually moved relatively to its supporting shaft.

PERCIVAL TRENTHAM MAW.

Witnesses:
 JOHN E. BONSFIELD,
 C. G. REDFEN.

Copies of this patent may be obtained for five cents each, by addressing the "Commissioner of Patents, Washington, D. C."